United States Patent
Maruyama et al.

(10) Patent No.: US 6,212,520 B1
(45) Date of Patent: Apr. 3, 2001

(54) DATABASE MANAGEMENT SYSTEM BASED ON CLIENT/SERVER ARCHITECTURE AND STORAGE MEDIUM STORING A PROGRAM THEREFOR

(75) Inventors: Hidefumi Maruyama, Kawasaki; Hiroyuki Nakamura; Kouji Takahashi, both of Odawara, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/049,089

(22) Filed: Mar. 27, 1998

(30) Foreign Application Priority Data

Oct. 16, 1997 (JP) .................................................. 9-283281

(51) Int. Cl.⁷ .................................................. G06F 17/30
(52) U.S. Cl. ........................... 707/10; 707/102; 707/101; 707/104; 707/202
(58) Field of Search ..................... 707/1, 2, 100, 707/10, 200, 9, 5; 395/631, 331

(56) References Cited

U.S. PATENT DOCUMENTS

| | | | |
|---|---|---|---|
| 5,561,763 | * 10/1996 | Eto et al. | 395/183 |
| 5,835,904 | * 11/1998 | Vicik et al. | 707/1 |
| 5,870,562 | * 2/1999 | Butman et al. | 395/200 |
| 5,873,086 | * 2/1999 | Fujjii et al. | 707/10 |
| 5,875,188 | * 1/1999 | Douglas | 707/9 |

* cited by examiner

*Primary Examiner*—Thomas Black
*Assistant Examiner*—Thuy Do
(74) *Attorney, Agent, or Firm*—Staas & Halsey LLP

(57) ABSTRACT

Disclosed is a database management control system based on the client/server architecture including a client process operating on a client machine and a server process operating on a server machine, which prevents resources from remaining allocated without being properly relinquished. When a client makes a request for connection to the server, a starting order identifier notifying device notifies the server process of a starting order identifier indicating the starting order of an operating system on which the client process operates. An executing entity search device of the server process searches for executing entities under control of an executing entity control device, which are correlated to the same network address as a network address of the client machine on which the client process operates. From the executing entities searched out, a starting order identifier comparing device selects executing entities correlated to a starting order identifier older than the starting order identifier notified, and a recovery device terminates these executing entities and recovers or relinquishes resources allocated thereto. This makes it possible to recover resources remaining uselessly unavailable, when the client machine, the power of which was once turned off, is started again and the client process thereof makes a request for connection to the server process.

10 Claims, 6 Drawing Sheets

| | IDENTIFIER OF COMMUNICATION PATH | NETWORK ADDRESS | EXECUTING ENTITY IDENTIFIER | OS STARTING TIME | CLIENT OS TYPE |
|---|---|---|---|---|---|
| INFORMATION OF 1ST EXECUTING ENTITY | 0x00000064 (SOCKET-ID) | 0x85a2505a (IP-ADDRESS :133.162.80.90) | 0x00000001 (EXECUTING ENTITY SERIAL NUMBER :1) | 0x34134918 (time_t TYPE :1997/09/08 9:38:48) | 0x00000001 (UXP/DS) |
| INFORMATION OF 2ND EXECUTING ENTITY | ... | ... | ... | ... | ... |

DATABASE MANAGEMENT SYSTEM BASED ON CLIENT/SERVER ARCHITECTURE AND STORAGE MEDIUM STORING A PROGRAM THEREFOR

BACKGROUND OF THE INVENTION

1. Field of the Invention

The present invention relates to a database management system based on the client/server architecture, and more particularly to a database management system of this kind constructed such that machines for sending a request for processing to a database are different from the machine that actually executes the requested processing.

2. Description of the Related Art

Conventionally, in the database management system based on the client/server architecture, the server software operates on a server machine to execute processing of the database, while the client software operates on a client machine on a network to which the server machine is connected. The network conveys requests for processing to the server and the results of the requests to the client.

In using a database managed by the database management system operating on a network to which the client machines and the server machine are connected, in general, when the client makes a request for access to the database, the server creates an executing entity which executes the request from the client and sends back the results of the processing of the request to the client. When the processing of the request is terminated, the executing entity is terminated or deleted. When the executing entity is created, resources of the server are allocated to the executing entity, and when the executing entity is terminated, the resources allocated to the executing entity are relinquished as well. These resources include memory in the server machine, a transaction lock controlled by the database management system for exclusive control, a memory area in a secondary storage medium for carrying out sorting operations, etc.

The machines based on the client-server architecture exist in operating environments different from each other. These machines use, as their operating systems, Windows 95 and Windows NT (Windows 95 and Windows NT are registered trademarks of Microsoft Corporation in the United States and other countries), or UNIX (developed and licensed by UNIX System Laboratories) -based operating systems. In the described configuration, during communications between a client machine and the server machine, the client machine may crash or the power thereof may be unexpectedly turned off. When one of these situations occurs after a request for access to the database is sent from the client machine to the server machine, information on the down conditions of the client machine is not sent to the server machine. The result is that the server carries out the processing in response to the request for access to the database, but the machine to which the results should be returned is no longer connected to the network so that the executing entity started in response to the request for access to the database continues to run and the resources allocated thereto remain unavailable on the server machine. As a result, when another client sends a request for access to the database to the server machine, there can be a case in which there are no resources which can be allocated to an executing entity newly created in response to the request, so that this client may be compelled to wait. Further, the client machine can go down not only when the power is turned off, but also when the reset button of the client machine is depressed.

To eliminate the inefficiency of the resources remaining allocated to an executing entity created for a client machine that made a request for access to the database but that went down thereafter, two methods are typically employed:

FIG. 5 is a block diagram schematically showing the arrangement of a conventional database management system. In FIG. 5, a client machine 101 and a server machine 111 are connected to a network 120, and the network 120 has an operator terminal 130 connected thereto and used in server administration. It is now assumed that in the client machine 101, a client process 102 has been started, while a database management system (DBMS) server process 112 has been started in the server machine 111. The database management system server process 112 has created a database (DB) access executing entity 113 in response to a request for access to the database from the client process 102, and resources 114 have been allocated to the database access executing entity 113. Further, the server machine 111 has a recovery command 115 provided therein for terminating the executing entity.

When the operator of the server monitors requests from the client, and if he recognizes that the power of the client machine 101 on which the client process 102 operates is in the OFF state due to some unknown cause during the access of the client process 102 to the database, he executes the recovery command 115 on the server machine via the operator terminal 130. The recovery command 115 terminates the database access executing entity 113 created in response to the request for access to the database from the client process 102 and relinquishes the resources 114 allocated to the database access executing entity 113 for the processing of the request. This makes these resources on the server machine 111 available for another client which makes a request for access to the database.

FIG. 6 is a block diagram schematically showing another example of construction of a conventional database management system. In FIG. 6, a client machine 101 and a server machine 141 are connected to a network 120. In the server machine 141, a database management system server process 142 operating thereon includes a database (DB) access executing entity 143, resources 144, and an executing entity control daemon 145 for controlling the database (DB) access executing entity 143. Further, the server machine 141 is capable of executing a network-monitoring function 146 provided by its operating system (OS).

When the client process 102 on the client machine 101 communicates with the database management system server process 142 on the server machine 141, both the machines are required to designate a port for sending and receiving messages between the two machines. In general, the combination of a port on one client machine 101 and a port on the server machine 141, combined with a physical medium for carrying out serial transfer of messages between the machines, is hereinafter called "a communication path". In one combination of one port of the client machine and one port of the server machine, there can exist a number of communication paths each of which can send and receive messages in parallel with another. "Socket" is one typical example of a communication path. Details of the "Socket" are described in literature "UNIX NETWORK PROCESSING," W. Richard Stevens, 1990 by Prentice Hall, Inc. A Simon & Schuster Company Englewood Cliffs, N.J. 07632.

Now, in order to make use of the network function of the operating system, the port via which communications are carried out is registered with the operating system. The network-monitoring function 146 of the operating system checks for a time during which communications are not being carried out, for each communication path, and if the communication path is not used for a predetermined time period, the communication path is canceled, and the process waiting to receive data via the communication path is notified of the cancellation of the communication path. The time period with reference to which the cancellation of each communication path is determined is set by the system administrator. When the executing entity control daemon 145 of the database management system server process 142 is notified of the cancellation of the communication path from its communications environment, it terminates the database access executing entity 143 which has been communicating via the communication path and keeping the resources 144 unavailable to other executing entities.

Thus, in the database management system which makes use of the clock function of the operating system for the network time-monitoring function, a predetermined monitoring time period is set and the network-monitoring function 146 of the operating system periodically checks to determine whether any communications were carried out within that time period. When the network-monitoring function 146 of the operating system detects that no communications were carried out over the predetermined time-monitoring period, it notifies the executing entity control daemon 145 of the cancellation of the communication path from the communications environment. It should be noted that if the predetermined monitoring time period is set to too short a time period, the overhead of the operating system is increased. To avoid this inconvenience, normally, it is set to a time period longer than two hours.

In the case where the executing entity termination function is provided on the server side, however, the server machine is required to constantly monitor whether any executing entity is running which is required to be terminated. If the power of the client machine is turned off when there is no operator monitoring the server, the resources allocated during extension of access to the database remain inaccessible on the server machine.

On the other hand, when the network-monitoring function of the operating system is utilized, it is difficult to set a reference time period with reference to which the state of no communications with a client is determined. More specifically, when the requests of clients impose heavy load on the server, it can take more than two hours to send back results of the processing requested by a client, which makes determining the proper reference time period largely dependent on the operating characteristics of the database, as well. Therefore, if communications paths on which no communications were carried out over the reference time period are all cancelled unconditionally, the problem of cancellation of communication paths which should not be cancelled may occur. Further, when the network time-monitoring function of the operating system is used, the overhead of the operating system becomes large since it must periodically monitor the system to determine whether communications are being carried out or not. Therefore, the reference time period is normally set to two hours or longer than two hours by increments of one hour. However, once the client machine goes down, the transaction is locked at least until the time-monitoring function is next initiated. As a result, processing requests for access to the database from other clients may be delayed during this time.

SUMMARY OF THE INVENTION

It is an object of the invention to provide a database management system based on the client/serer architecture which makes it unnecessary for an operator to monitor the system to determine whether there are any resources remaining to be recovered (relinquished), and makes it possible to positively relinquish resources remaining unavailable on the server without making use of the network-monitoring function of an operating system.

To attain the above object, the present invention provides a database management system based on a client/server architecture, including a client process operating on a client machine, and a server process operating on a server machine.

The database management system based on the client/server architecture is characterized by comprising starting order identifier notifying means for acquiring a starting order identifier indicative of a starting order of an operating system of the client machine and sending the starting order identifier to a server side, executing entity control means for correlating a network address of the client machine set for communications with the client machine, an executing entity identifier indicative of an executing entity for processing a request for access to a database, which is received from the client process, and the starting order identifier notified to the server process, for control thereof on the server side, executing entity search means for searching for an executing entity correlated to the same network address as the network address of the client machine on which the client process is operating, when the executing entity control means receives the request for access to the database from the client process, starting order identifier comparing means for comparing a starting order identifier correlated to the executing entity searched out with the starting order identifier notified by the client process which has made the request for access to the database, and recovery means for terminating an executing entity having a different starting order identifier from the starting order identifier notified, and recovering resources allocated to the executing entity having the different starting order identifier, for database access processing, based on a result of the comparison by the starting order identifier comparing means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing an example of an executing entity control table;

DESCRIPTION OF THE PREFERRED EMBODIMENTS

Figure 1:
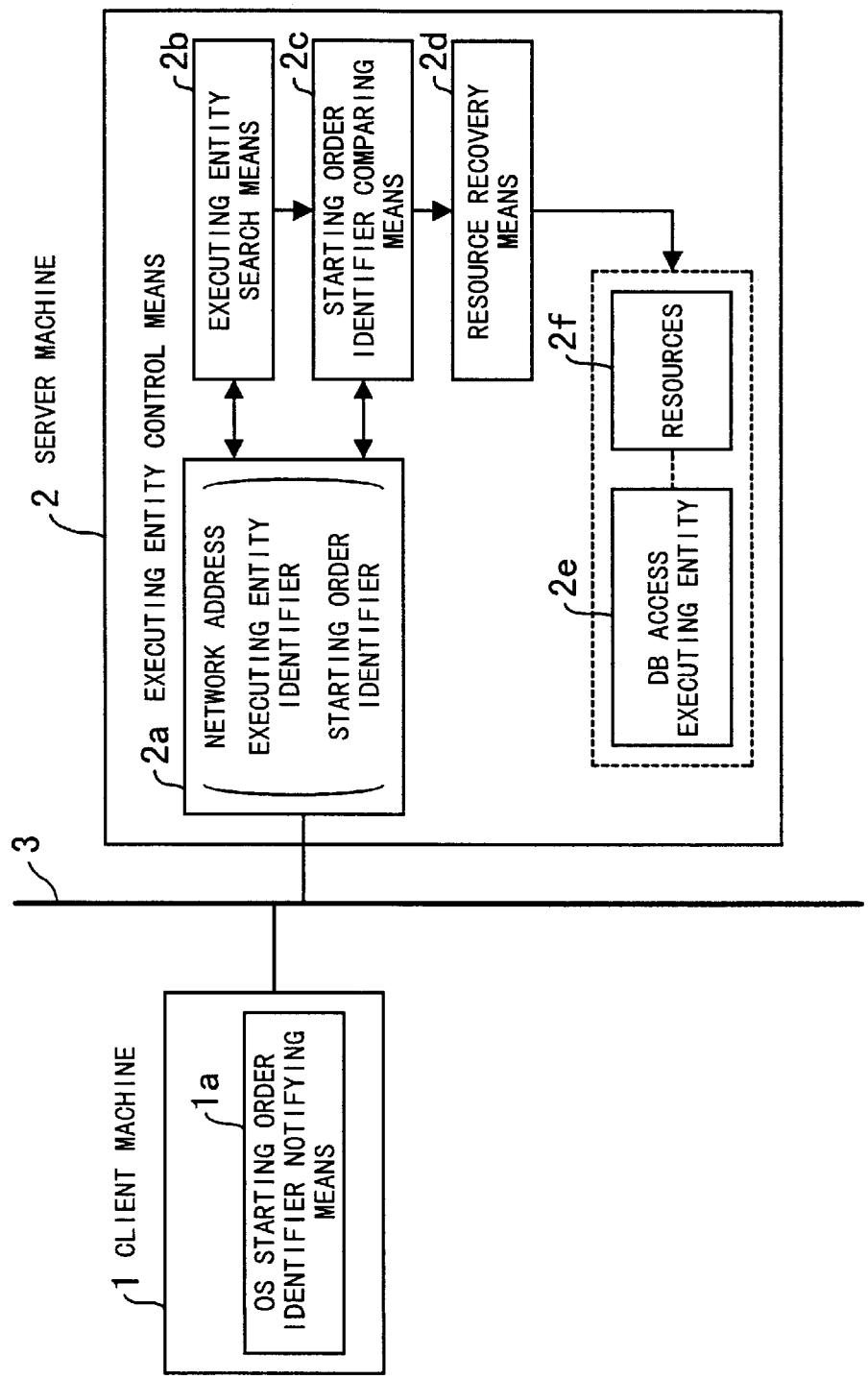
FIG. 1 is a diagram showing the principles of a database management system based on the client/server architecture, according to the present invention.

The invention will now be described in detail with reference to drawings showing a preferred embodiment thereof Referring first to FIG. 1, there are shown principles of a database management system based on the client/server architecture. In FIG. 1, a client machine 1 and a server machine 2 are connected by a network 3. In the client machine 1, application software is running to access a database, while database management system server software is running in the server machine 2, thereby constituting, as a whole, a database management system based on the client/server architecture. The client machine 1 includes operating system (OS) starting order identifier notifying means 1a. On the other hand, the server machine 2 includes executing entity control means 2a, executing entity search means 2b, starting order identifier comparing means 2c, and resource recovery means 2d. A database (DB) access executing entity 2e is created in response to a database access request made by the client machine 1, to carry out database access processing, and when the requested database access processing is completed, the database access executing entity is terminated or deleted. Resources 2f are resources in the server machine 2 which are acquired by an extension of database access request from the client. The resources 2f include memory in the server machine 2, a transaction lock, and a memory area in a secondary storage medium for carrying out sorting operations, etc. The executing entity control means 2a correlates and controls a network address set or assigned to a client machine 1 for communication with the client machine 1, an executing entity identifier indicative of the database access executing entity 2e which processes the database access request from the client machine 1, and an operating system starting order identifier notified by the client machine 1.

According to the database management system, first, when the client machine 1 makes a database access request to the database management system server software running on the server machine 2, the operating system starting order identifier notifying means 1a of the client machine 1 notifies the database management system server software of the operating system starting order identifier. An operating system starting time at which the client machine 1 was started is made use of as the operating system starting order identifier.

When the server machine 2 receives the database access request from the client machine 1, the executing entity search means 2b searches all the database access executing entities controlled by the executing entity control means 2a, which are correlated to a network addresses assigned to the client machine 1. Then, the starting order identifier comparing means 2c compares the operating system starting order identifiers correlated to the database access executing entities searched out with the operating system starting order identifier designated or notified by the client machine 1, and selects a database access executing entity 2e correlated to an operating system starting order identifier different from the designated operating system starting order identifier, if any. The resource recovery means 2d terminates the selected database access executing entity or entities 2e and recovers or relinquishes the resources allocated thereto, to thereby make these resources available by another client making a database access request. Thereafter, the database access request received from the client machine 1 is normally complied with or processed.

According to this configuration of the system, when the client machine 1 had its power unexpectedly turned off, for instance, the database access executing entity 2e created before the client machine 1 was turned off can be terminated and the resources 2f allocated to the executing entity 2e can be recovered or relinquished, when the client machine 1 is started again and connected to the database management system server software running on the server machine 2.

Next, a preferred embodiment of the present invention will be described with reference to drawings.

Figure 2:
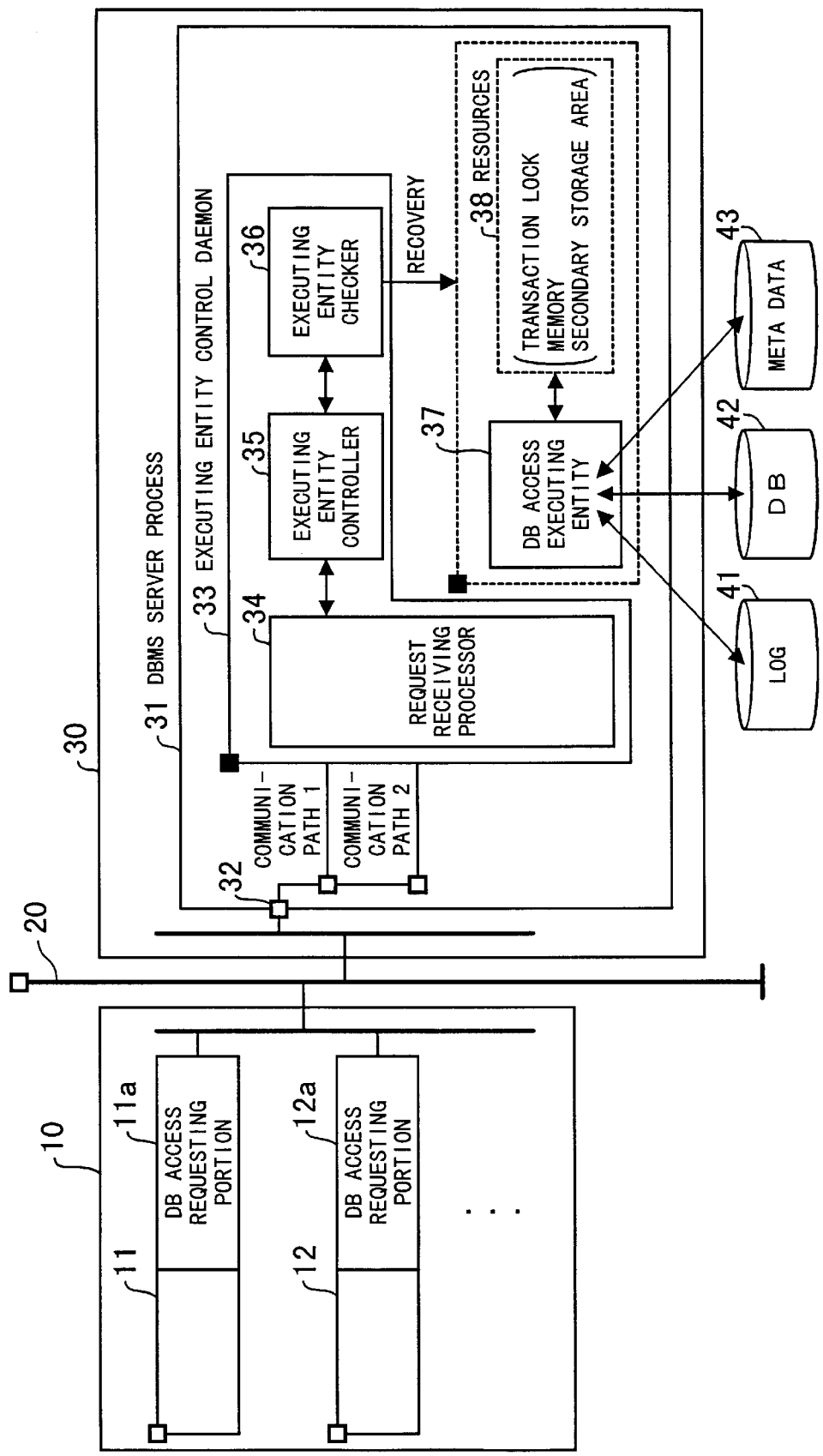
FIG. 2 is a block diagram showing the whole arrangement of the database management system based on the client/server architecture.

FIG. 2 shows the whole arrangement of a database management system based on the client/server architecture. As shown in FIG. 2, this system includes a client machine 10 on which a UNIX-based operating system UXP/DS operates (UXP is a trademark owned by Fujitsu Limited, and UXP/DS is a commercial product name of this system). Further, the client machine 10 has a plurality of application programs 11, 12, . . . , installed thereon. Particularly, the application programs 11, 12 have respective database access requesting portions 11a, 12a as drivers used when these application programs make respective database access requests to the database management system server process. The database access requesting portions 11a, 12a each have not only the requesting function peculiar thereto but also a function of acquiring an operating system starting time at which the operating system of the client machine 10 is started.

The client machine 10 is connected to the network 20. In the present embodiment, this network 20 is a LAN (Local Area Network), but it may be a WAN (Wide Area Network) having a plurality of LANs connected via bridges, routers, etc. Further, connection between the client machine 10 and the server machine 30 is established by TCP/IP (transmission control protocol/internet protocol).

The server machine 30 has a database management system (DBMS)server process 31 operating thereon, which is connected via a port 32 to the network 20. The database management system server process 31 includes an executing entity control daemon 33 which is resident, and the executing entity control daemon 33 has a request receiving processor 34, an executing entity controller 35, and an executing entity checker 36. DBS server process 31 also includes a database (DB) access executing entity 37 which is created when a database access request is received via the request receiving processor 34, and resources 38 which is allocated to the database access executing entity 37. Further, the database access executing entity 37 is correlated to a storage device 41 for storing log data, a storage device 42 for storing database files each storing data, and a storage device 43 for storing meta data for controlling data of the database. It should be noted the database server management system process provides instruction threads as units of execution in response to respective requests of the client, and each instruction thread is called "an executing entity" in the present specification. The database access requesting portions 11a, 12a and the executing entity checker 36 are novel component elements provided according to the invention, and the executing entity controller 35 is a component element modified for the present database management system. The remainder are component elements of the state of the art.

Now, these component elements will be described in detail.

First, according to the demand for connection to the database management system by the application programs 11, 12, the database access requesting portions 11a, 12a each carry out the following processing:

The database access requesting portions 11a, 12a acquire a starting time at which the operating system of the client machine 10 was started.

Next, the database access requesting portions 11a, 12a establish a communication path by designating a port which has been registered for connection to the database management system of the server machine 30. This processing is realized by a function of the operating system of the client machine 10 and a function of that of the server machine 30. When the communication path is established, an identifier for identifying the communication path is returned from the server to the client. Hereafter, by using this identifier, it is possible to access the communication path established through the designated port.

Then, the database access requesting portions 11a, 12a send a request to the server machine 30, for connection to the data base management system server process 31 by designating the returned identifier indicative of the communication path, the acquired starting time of the operating system, and the network address of the client machine 10. As the network address, an IP address, for instance, is used.

In the server machine 30, the request receiving processor 34 is made ready for receiving a message sent from the client machine 10 through a port 32 of the database management system server process 31.

When the request by the client machine 10 for connection to the database management system server process 31 is received, the request receiving processor 34 designates the identifier of the communication path of the received message, the starting time of the operating system, and the network address of the client machine 10 to thereby request the executing entity controller 35 to create an executing entity for carrying out database access processing based on the requested connection.

More specifically, when the database access request is received from the client machine 10, the request receiving processor 34 designates the identifier of the communication path to thereby request the executing entity controller 35 to search for an executing entity which should execute the processing of the database access request, to thereby determine whether the executing entity having the identifier of the designated communication path has already been created. If no such executing entity has been created, a new database access executing entity is created. Thereafter, the database access processing is requested of the database access executing entity searched out or created.

Next, when the request of creating the executing entity is received from the request receiving processor 34, the executing entity controller 35 carries out the following processing:

First, the executing entity controller 35 requests the executing entity checker 36 to terminate the executing entity which was processing the database access request made by the client machine 10 in the past. In doing this, the executing entity controller 35 designates the starting time of the operating system of the client machine 10, and the network address for identifying the client machine 10 as a unique entity.

Then, the executing entity controller 35 creates a database access executing entity 37, and correlates the database access executing entity 37 thus created, the identifier of the communication path sent from the client machine 10 which has made the database access request, the starting time of the operating system of the client machine 10, the network address of the client machine 10, and the type of the operating system of the client machine 10, to register results of the correlation in the memory.

The executing entity checker 36 checks all the database access executing entities correlated to the designated network address to determine whether there is any executing entity having a starting time of the operating system of the client machine 10 older than the designated starting time of the operating system of the same. If there is any database access executing entity having the older starting time of the operating system, the transaction lock, and resources of a memory and a secondary storage area such as a sorting work area are recovered or relinquished, and the executing entity per se is terminated or deleted.

The database access executing entity 37 forms a data base access schedule by analyzing the database access request sent from the client, and carries out the database access processing according to the schedule. In order to do this, the database access executing entity 37 obtains a transaction lock, and resources of memory and a secondary storage area, allocated thereto. These resources allocated are correlated to the database access executing entity created, and when this executing entity is terminated, the resources allocated thereto are recovered or relinquished.

Next, how the above component elements are realized will be described.

First, when the database access requesting portions 11a, 12a of the client machine 10 acquire the starting time of the operating system, they make use of a function of the operating system. In general, the operating system provides means for acquiring the starting time of the operating system. For instance, in UNIX-based operating systems, a function for acquiring the starting. time of the operating system is provided. On the other hand, in Windows-based operating systems, there are provided a function for acquiring the present time and a function for acquiring a time elapsed after the operating system was started, and hence by subtracting the elapsed time from the present time, the starting time can be acquired.

Both the UNIX-based operating systems and the Windows-based operating systems generally have a communications capability which enables a client machine to obtain a network address thereof. Therefore, in the present embodiment, the operating system of the client machine 10 obtains a network address and the network address thus obtained is sent to the server machine 30. However, this is not limitative, but the server machine 30 may assign the network address to the client machine 10 by the communications capability of the operating system thereof.

The executing entity controller 35 of the server controls the database access executing entities according to an executing entity control table in which each database access executing entity, an identifier of a communication path, a starting time of an operating system, and a network address of the client, and a type of an operating system of the client are organized in a correlated manner.

FIG. 3 shows an example of the executing entity control table. As shown in FIG. 3, the executing entity control table 50 is composed of fields of an identifier of a communication path, a network address, an executing entity identifier, a starting time of an operating system of a client, and a type of the operating system of the client. It should be noted that the denotation of the starting time of the operating system depends on the type of the operating system, and therefore, the starting time of the operating system of the client is organized in combination with the type of the operating system as well.

The types of operating systems are represented such that UXP/DS, which is as a UNIX-based operating system, is represented by "0x00000001", SOLARIS (trademark of Sun Microsystems, Inc.) by "0x00000002", and Windows 95/NT by "0x00000010". In the illustrated example of FIG. 3, it is shown that an operating system of a client correlated to a first executing entity is UXP/DS. It should be noted that information indicating the type of an operating system is sent from the client machine 10 to the server when a request for connection to the database management system server process 31 is made by the client machine 10. The database access requesting portions 11a, 12a of the client have information on the kind of their own operating system since different load modules of the database access requesting portions 11a, 12a are made for installation on respective different types of operating systems of client machines 10.

The identifier of the communication path has a value dependent on the network communications capability of each operating system. In the case of UNIX-based operating system, a socket identifier (SOCKET-ID) is generally employed as the identifier of the communication path, and the first executing entity in FIG. 3 uses a socket identifier as well.

The network address is an address uniquely set or assigned to each machine on the network. In the example illustrated in FIG. 3, IP addresses are used. Although in the present embodiment, the IP addresses are used as the network addresses, this is not limitative, but any information which can uniquely identify a client machine, e.g. MAC (media access control), may be employed.

The executing entity identifier is an identifier for uniquely identifying a database access executing entity created by the database management system server process 31 in response to each request of access to the database management server process 31 made by the application process on the client side. When the client makes a database access request under a certain connection to the server machine, the server causes the database access executing entity corresponding to the connection to carry out the database access processing.

In a method of carrying out the database access processing by dispatching a thread within the database management system server process 31, each executing entity identifier is formed by a value (1, 2, 3, . . . ) allocated to an executing entity by counter control within the database management system server process 31. In the example shown in FIG. 3, each executing entity identifier is allocated by counter control. It should be noted that in another method of using another process for executing the processing executed by the database access executing entity of the present embodiment, a process ID is used as the executing entity identifier.

A starting time of the operating system assumes a value dependent on the operating system of a client. For instance, in the case of a UNIX-based operating system, it takes the form of a function "time_". The starting time of the first executing entity shown in FIG. 3 also has a value represented by "time_". On the other hand, in the case of Windows 95/NT, the starting time of the operating system is represented by a value of the difference obtained by using a function for acquiring the present time and a function for acquiring a time period elapsed after the operating system was started.

The information in the executing entity control table 50 is searched by using a key of an identifier of a communication path. However, this is not limitative, but a hash control table for which an identifier of a communication path is used as a hash key may be employed.

Next, recovery processing carried out by the executing entity checker 36 will be described in detail with reference to a flowchart therefor.

Figure 4:
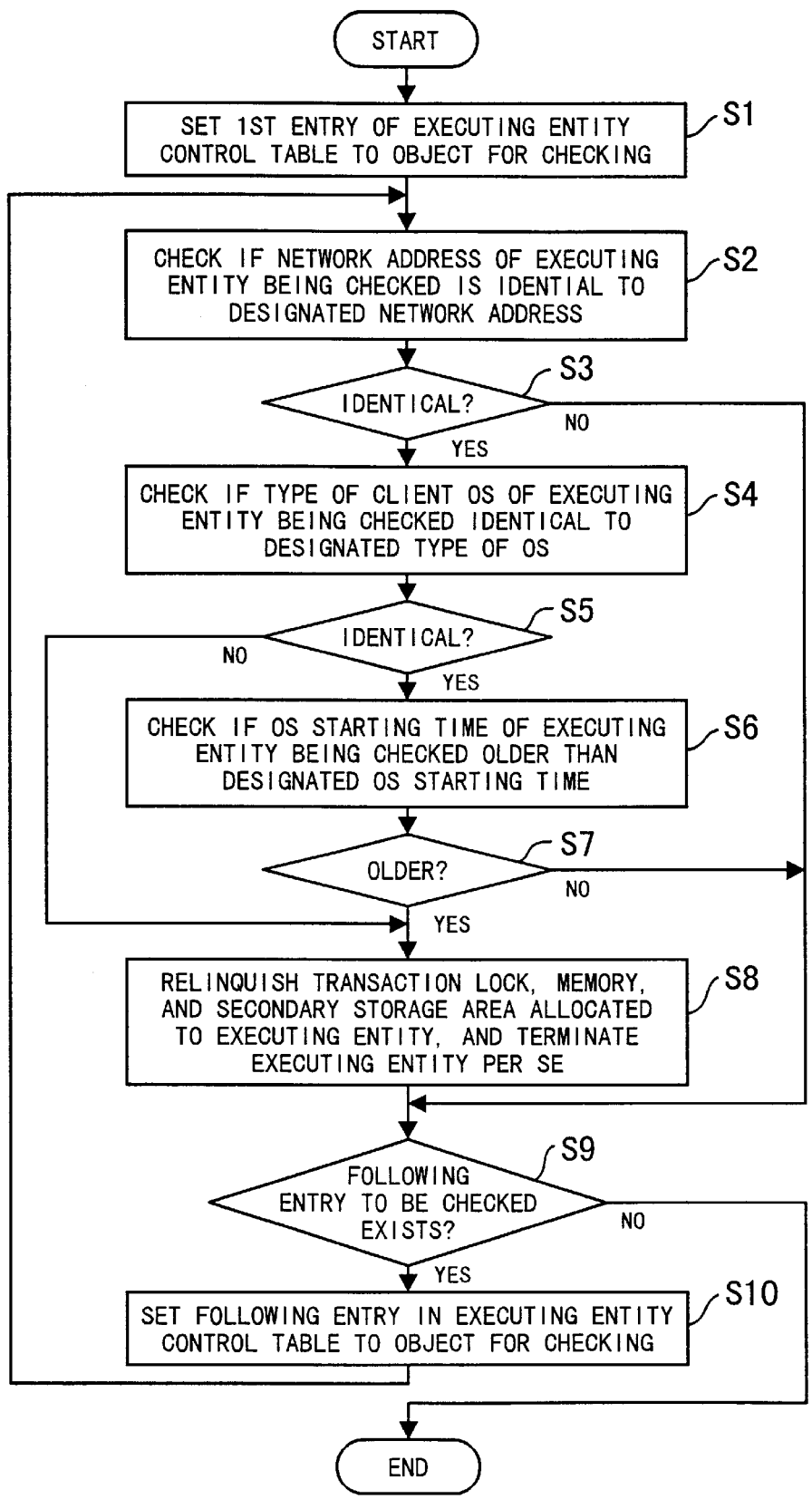
FIG. 4 is a flowchart showing a flow of processing executed by an executing entity checker.
Figure 5:
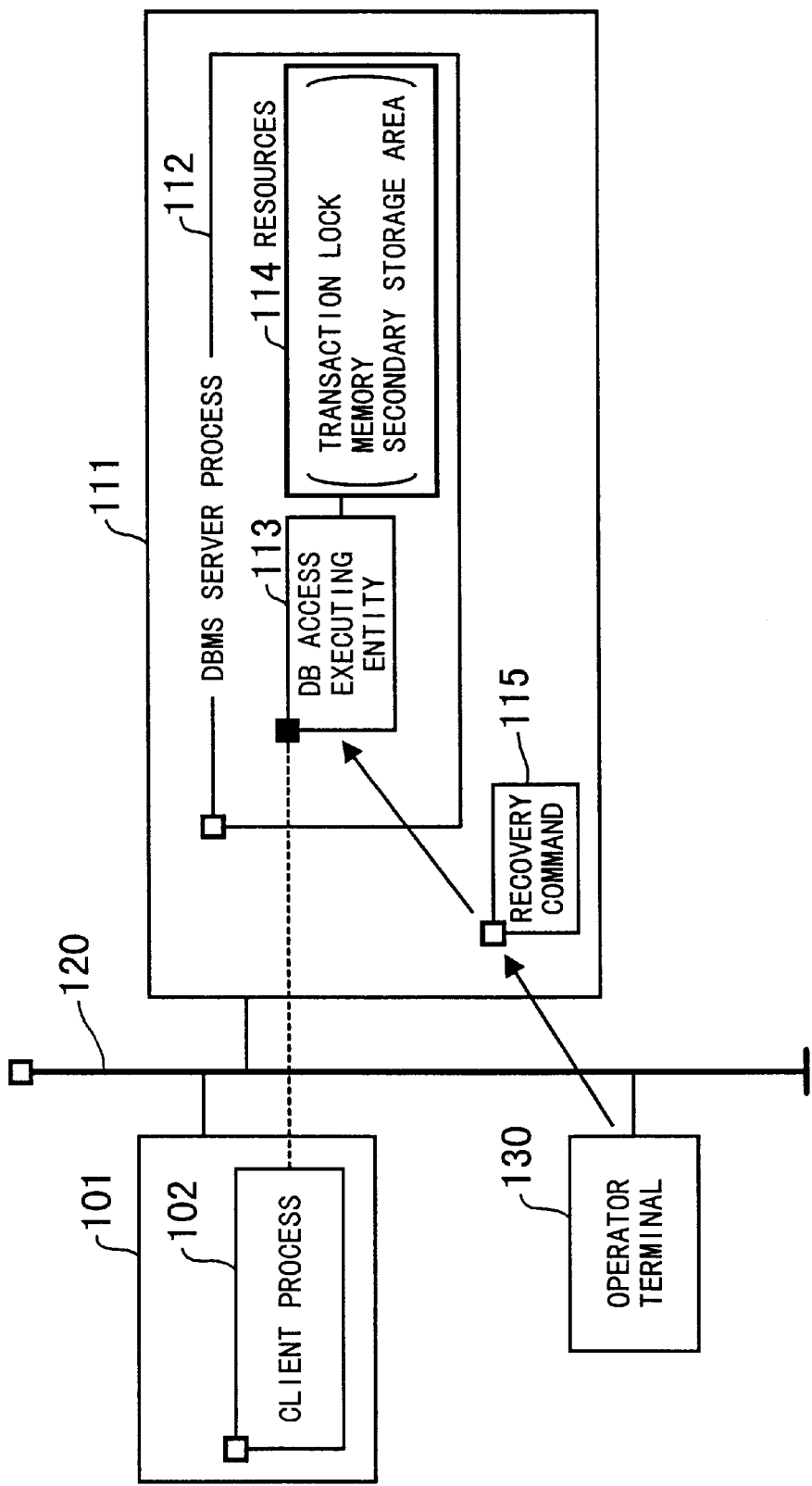
FIG. 5 is a block diagram showing an example of construction of a conventional database management system.
Figure 6:
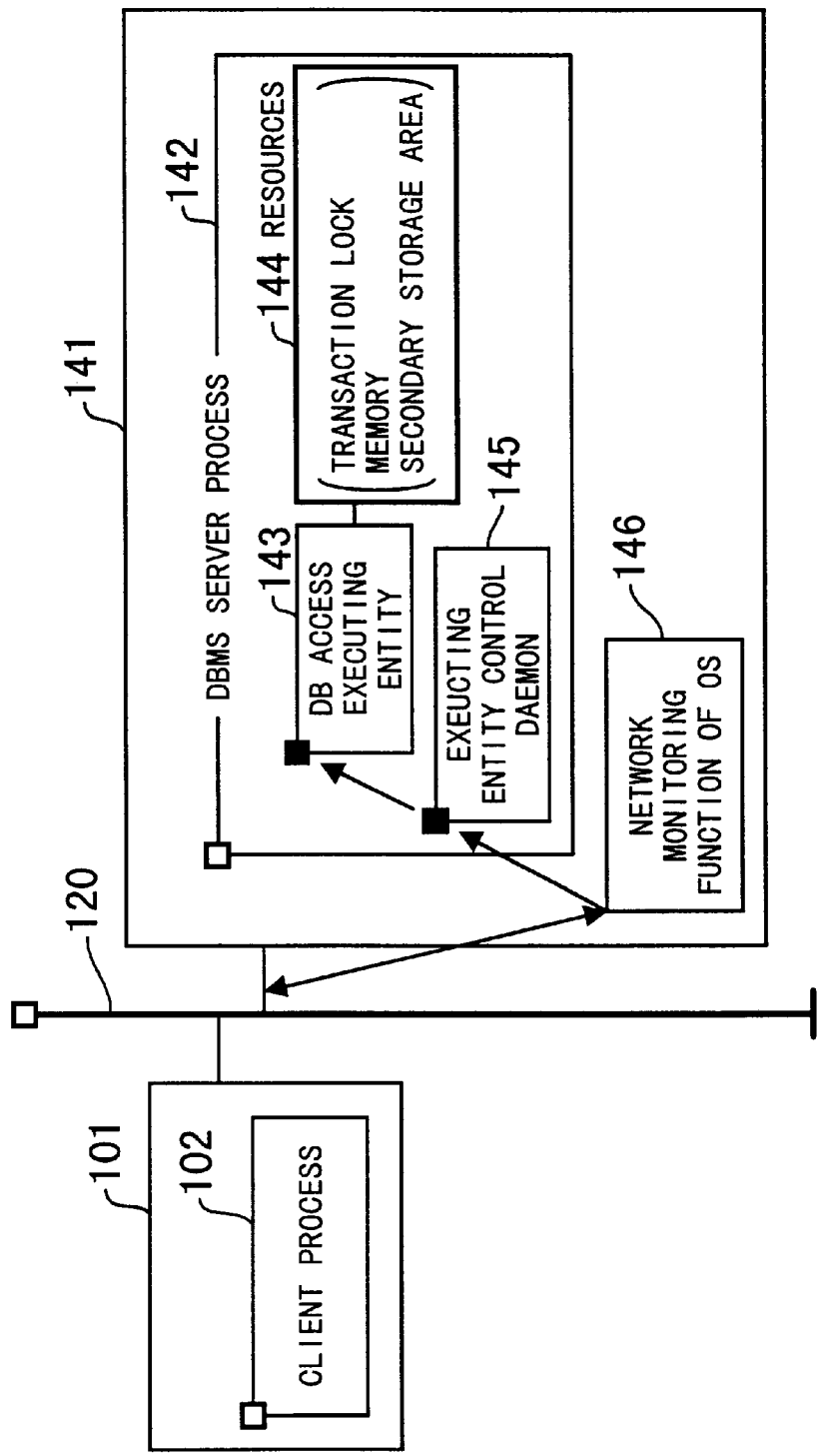
FIG. 6 is a block diagram showing another example of construction of a conventional database management system.

FIG. 4 shows the flowchart illustrating a flow of processing executed by the executing entity checker 36. The executing entity checker 36 searches information prepared by the executing entity controller 35 to terminate an old executing entity, if necessary.

More specifically, a first entry of the executing entity control table 50 is set to an executing entity for checking at a step S1. Then, it is checked at a step S2 whether or not a network address of the executing entity being checked is identical to a network address of the client machine 10. This determines whether the executing entity being checked is created for the same client machine as the present client machine (step S3). If the former is identical to the latter, it is checked at a step S4 whether or not the type of an operating system of the client correlated to the executing entity being checked is identical to the type of an operating system designated by the client machine 10. Then, at a step S5, it is determined from a result of the checking in the step S4 whether or not the types of the two operating systems are identical to each other. If they are identical, it is checked at a step S6 whether the starting time of the operating system correlated to the executing entity being checked is older than the designated starting time of the operating system. The reason for checking whether the starting time of the operating system correlated to the executing entity being checked is older than the starting time designated by the present client making the request for connection to the server is as follows: A plurality of communication paths are established between one client machine and the server machine, and a plurality of executing entities are created in a manner correlated to the same network address. Therefore, the executing entities correlated to the same network address can include e.g. an executing entity created before the power of the client machine was turned off and an executing entity created after the client machine was thereafter started and connected to the server again. This makes it inappropriate to unconditionally terminate all the executing entities correlated to the same network address. To obtain information whether an executing entity correlated to the same network address may be terminated, the starting time of the operating system of the client machine is made use of. If the executing entity is correlated to a starting time of the client machine older than the designated one, the executing entity is determined to have created before the power of the client machine was turned off, and hence terminated.

Next, it is determined at a step S7 from a result of checking of the starting time at the step S6 whether or not the starting time of the client machine correlated to the executing entity being checked is older than the designated one. If it is determined at the step S7 that the starting time of the operating system of the executing entity being checked is older, or if it is determined at the step S5 that the operating systems are different from each other, resources 38 allocated to the database access executing entity 37, including a transaction lock, a memory area, and a secondary storage area are recovered or relinquished, and at the same time the database access executing entity 37 per se is terminated at a step S8. The recovery of the resources 38 cancels the transaction lock to thereby permit another database access request to be processed, and the memory area allocated to the database access executing entity is relinquished to make the area available to another database access request. Further, a file generated through sorting operations etc., and stored in the secondary storage area, which was possessed by the database access executing entity, is deleted by a file system of the operating system of the server machine to make the area storing the file available. Then, information concerning the database access executing entity 37 is deleted from the executing entity control table 50.

If the recovery processing is terminated, if it is determined at the step S3 that the network address correlated to the executing entity being checked is different from the designated one, or if it is determined at the step S7 that the starting time of the operating system correlated to the executing entity being checked is not older, it is determined at a step S9 whether or not the executing entity control table 50 contains a further entry for being checked. If no further entry exists, the recovery processing is terminated, whereas if another entry exists, this entry is set to an object for being checked at a step S10, and the program returns to the step S2 to start the above procedure again with the checking of the network address thereof.

Although in the above embodiment, information of a starting time of an operating system of a client is utilized for determining whether an executing entity correlated to the same network address may be terminated, this is not limitative, but a counter which counts up or increments whenever the operating system is started may be used to provide a value indicative of the number of times of starting of the operating system for use in the above determination.

As described heretofore, according to the present invention, when the client makes a request to the server for access to the database, the client machine is caused to send information on an order of starting of an operating system of the client machine, while the server operates to terminate all executing entities which are different in information for identifying the order of starting of the operating system of the client and recover or relinquish resources allocated to these executing entities. This makes it possible to terminate executing entities created in response to respective requests by a client and remaining to run on the server even after the power of the client machine was turned off, as well as recover resources allocated to the executing entities, when the client machine is started and connected to the server again, to thereby make the resources available to another access request to the database.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A database management system based on a client/server architecture, including a client process operating on a client machine, and a server process operating on a server machine, comprising:

starting order identifier notifying means for acquiring a starting order identifier indicative of a starting order of an operating system of said client machine and sending said starting order identifier to a server process;

executing entity control means for correlating a network address of said client machine set for communications with said client machine, an executing entity identifier indicative of an executing entity for processing a request for access to a database, which is received from said client process, and said starting order identifier notified to said server process, for control thereof on said server process;

executing entity search means for searching for an executing entity correlated to the same network address as said network address of said client machine on which said client process is operating, when said executing entity control means receives said request for access to said database from said client process;

starting order identifier comparing means for comparing a starting order identifier correlated to said executing entity searched out with said starting order identifier notified by said client process which has made said request for access to said database; and recovery means for terminating an executing entity having a different starting order identifier from said starting order identifier notified, and recovering resources allocated to said executing entity having said different starting order identifier, for database access processing, based on a result of said comparison by said starting order identifier comparing means.

2. A database management system according to claim 1, wherein said starting order identifier notifying means sends said starting order identifier to said server process when said client process makes a request for connection to said server process.

3. A database management system according to claim 1, wherein said starting order identifier is a starting time at which said operating system of said client machine was started.

4. A database management system according to claim 1, wherein said executing entity control means correlates a communication path identifier for uniquely identifying a communication path via which messages are sent from said client process, to said network address, for control thereof.

5. A client apparatus including a client process operating thereon to make a request to a server process of a database management system based on a client/server architecture, for access to a database, the client apparatus comprising starting order identifier notifying means for acquiring a starting order identifier indicative of a starting order of an operating system on which said client process is operating, and sending said starting order identifier to said server process.

6. A server apparatus including a server process operating thereon to process a request for access to a database, which is received from a client process of a database management system based on a client/server architecture, the server apparatus comprising:

executing entity control means for correlating a network address of said client machine set for communications with a machine on which said client process is operating, an executing entity identifier indicative of an executing entity for processing a request for access to a database, which is received from said client process, and a starting order identifier notified by said client process, for control thereof;

executing entity search means for searching for an executing entity correlated to the same network address as said network address of said machine on which said client process is operating, when said executing entity control means receives said request for access to said database from said client process;

starting order identifier comparing means for comparing a starting order identifier correlated to said executing entity searched out with said starting order identifier notified by said client process which has made said request for access to said database; and recovery means for terminating an executing entity having a different starting order identifier from said starting order notified, and recovering resources allocated to said executing entity having said different starting order identifier, for database access processing, based on a result of said comparison by said starting order identifier comparing means.

7. A computer readable storage medium storing a program of a client process of a database management system based on a client/server architecture, comprising a client-side program to cause a computer on which said client process is operating to function as starting order identifier notifying means for acquiring a starting order identifier indicative of an order of starting of an operating system on which said client process is operating and sending said starting order identifier to a server process.

8. A computer-readable storage medium storing a program of a server process of a database management system based on a client/server architecture, comprising a server-side program to cause a computer on which said server process is operating to function as executing entity control means for correlating a network address of a client machine on which a client process is operating, said network address being set for communications with said client machine, an executing entity identifier indicative of an executing entity for processing a request for access to a database, which is received from said client process, and a starting order identifier of an operating system of said client machine, which is notified by said client process, for control thereof, executing entity search means for searching for an executing entity correlated to the same network address as said network address of said client machine on which said client process is operating, when said executing entity control means receives said request for access to said database from said client process, starting order identifier comparing means for comparing a starting order identifier correlated to said executing entity searched out with said starting order identifier notified by said client process, which has made a request for connection to said server process, and recovery means for terminating an executing entity having a different starting order identifier from said starting order identifier notified, and recovering resources allocated to said executing entity having said different starting order identifier, for database access processing, based on a result of said comparison by said starting order identifier comparing means.

9. A method of managing a database of a database management system based on a client/server architecture including a client process operating on a client machine and a server process operating on a server machine, comprising:

sending a starting order identifier indicative of a starting order of an operating system of said client machine on which said client process is operating, to said server process, when said client process makes a request to said server process for connection thereto;

searching for an executing entity correlated to the same network address as a network address of said client machine on which said client process is operating, when said server process receives said request for connection to said server process from said client process;

comparing a starting order identifier correlated to said executing entity searched out with said starting order identifier notified by said client process which has made said request for connection to said server process; and terminating an executing entity having a different starting order identifier from said starting order identifier notified, and recovering resources allocated to said executing entity having said different starting order identifier, for database access processing, based on a result of said comparison.

10. A database management apparatus, comprising:

a starting order notifying unit to acquire a starting order identifier indicative of a starting order of an operating system of a client machine and to send the starting order identifier to a server process;

an executing entity controller to correlate a network address of the client machine set to communicate with the client machine, an executing entity identifier indicative of an executing entity to process a request for access to a database, which is received from the client process, and the starting order identifier notified to the server process, to control thereof on the server process;

an executing entity searcher to search for an executing entity correlated to the same network address as the network address of the client machine on which the client process is operating, when the executing entity controller receives the request for access to the database from the client process;

a starting order identifier comparing unit to compare a starting order identifier correlated to the executing entity searched out with the starting order identifier notified by the client process which has made the request for access to the database; and a recovery unit to terminate an executing entity having a different starting order identifier from the starting order identifier notified, and recovering resources allocated to the executing entity having the different starting order identifier, for database access processing, based on a result of the comparison by the starting order identifier comparing unit.

* * * * *

UNITED STATES PATENT AND TRADEMARK OFFICE
CERTIFICATE OF CORRECTION

PATENT NO.   : 6,212,520 B1
DATED        : April 3, 2001
INVENTOR(S)  : Hidefumi Maruyama et al.

It is certified that error appears in the above-identified patent and that said Letters Patent is hereby corrected as shown below:

Title page,
Item [56], References Cited,
Change "5,875,188, 1/1999 Douglas" to -- 5,875,188  2/1999 Dawe --

Signed and Sealed this

Eighteenth Day of December, 2001

Attest:

Attesting Officer

JAMES E. ROGAN
Director of the United States Patent and Trademark Office